United States Patent
Jeon

(10) Patent No.: US 8,850,094 B2
(45) Date of Patent: Sep. 30, 2014

(54) METHOD FOR SHARING INPUT AND OUTPUT PORTS

(75) Inventor: Jong Wook Jeon, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 405 days.

(21) Appl. No.: 13/350,707

(22) Filed: Jan. 13, 2012

(65) Prior Publication Data

US 2012/0182773 A1    Jul. 19, 2012

(30) Foreign Application Priority Data

Jan. 17, 2011    (KR) .................. 10-2011-0004698

(51) Int. Cl.
*G06F 13/36* (2006.01)
*H02M 7/493* (2007.01)
*G06F 13/00* (2006.01)

(52) U.S. Cl.
CPC .................................... *H02M 7/493* (2013.01)
USPC .......... 710/110; 710/2; 710/5; 710/8; 710/15; 710/32

(58) Field of Classification Search
None
See application file for complete search history.

(56) References Cited

U.S. PATENT DOCUMENTS 6,281,664 B1 *   8/2001   Nakamura et al. .............. 322/22
8,106,765 B1 *   1/2012   Ackerson et al. ............. 340/538

FOREIGN PATENT DOCUMENTS

| CN | 100379176 | 4/2008 |
| CN | 101925325 | 12/2010 |
| JP | 2008178236 | 7/2008 |
| KR | 1020080079770 | 9/2008 |

OTHER PUBLICATIONS

The State Intellectual Property Office of the People's Republic of China Application Serial No. 201210024905.3, Office Action dated Dec. 23, 2013, 11 pages.

* cited by examiner

*Primary Examiner* — Scott Sun
(74) *Attorney, Agent, or Firm* — Lee, Hong, Degerman, Kang & Waimey

(57) ABSTRACT

Disclosed is a method for sharing input/output ports among inverters. A sharing method by a master inverter according to the present disclosure is such that data to be outputted to an output port of a slave inverter is transmitted to the slave inverter where data inputted to input port of the slave inverter is received. Furthermore, a sharing method by the slave inverter is such that data transmitted along with a request frame is outputted to an output port in case of receiving the request frame requesting use of the output port from the master inverter, where data used by the master inverter among data received from input port is transmitted to the master inverter.

11 Claims, 6 Drawing Sheets

FIG. 4A

| MAGNETIC IO DATA | MAI1 |
| | MAI2 |
| | MDI |
| | MAO |
| | MDO |
| SLAVE IO DATA | SAI1 |
| | SAI2 |
| | SDI |
| | SAO |
| | SDO |

FIG. 4B

| SAI1 | MAGNETIC IO DATA |
| SAI2 | |
| SDI | |
| SAO | |
| SDO | |
| MAI1 | MASTER IO DATA |
| MAI2 | |
| MDI | |
| MAO | |
| MDO | |

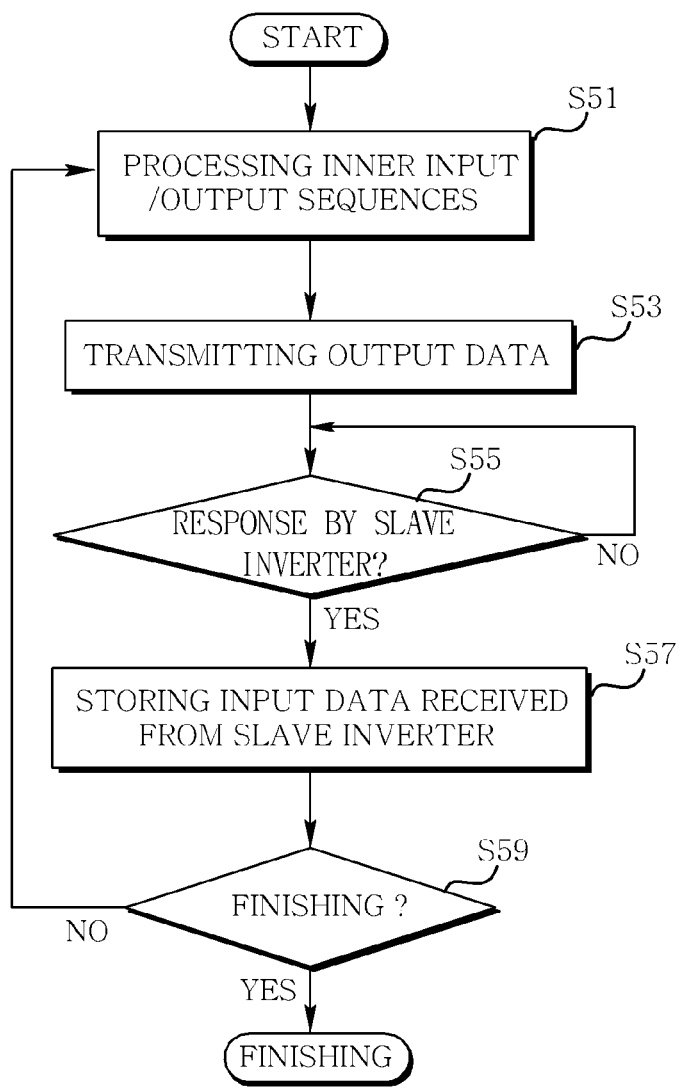

METHOD FOR SHARING INPUT AND OUTPUT PORTS

Pursuant to 35 U.S.C. §119 (a), this application claims the benefit of earlier filing date and right of priority to Korean Patent Application No. 10-2011-0004698, filed on Jan. 17, 2011, the contents of which is hereby incorporated by reference in their entirety.

BACKGROUND OF THE DISCLOSURE

1. Field

The teachings in accordance with the exemplary embodiments of this present disclosure generally relate to a method for sharing input and output ports, and more particularly to a method for sharing input and output ports configured for use in an inverter driving a motor.

2. Background

Generally, an inverter for driving a motor is mounted with a variety of input and output ports including digital input (DI), a digital output (DO), an analogue input (AI), and an analogue output (AO). FIG. 1 illustrates input/output ports of an inverter according to prior art.

Referring to FIG. 1, an inverter (100) includes D11 to D17 ports (110), a DO1 port (111) which is a transistor output, a DO2 port (112) which is a relay output, an AI1 port (113) which is a voltage input, an AI2 port (114) which is a current input, an AO1 port (115) which is a voltage output, and an AO2 port (116) which is a current output. In addition, the inverter (100) includes an interface unit (120) for communication with an outside device.

The input/output ports are used for feedback of various sensors (pressure, position, contact point, temperature, flow speed and flux, etc) for each device or an output of a meter, and the number of required input/output ports and types of required input/output ports vary per inverter even in a system. Furthermore, each inverter has a variety of parameters (e.g., analogue scale, offset value, etc) of input/output ports, and is set up to cater to the system.

FIG. 2 illustrates a system using two inverters according to prior art. Referring to FIG. 2, the system using two inverters according to the prior art includes first and second inverters (200, 300), an upper level controller (400) and a sensor (500). In the abovementioned system, the first inverter (200) receives a signal from the sensor (500), the upper level controller (400) and the second inverter (300) through an AI port (211), a DI port (212) and AI port (213).

Meanwhile, in a case there is a need of inputting another signal to the first inverter (200) from the sensor (500), an extension input module (230) was conventionally mounted. However, there is a disadvantage in that addition of the extension input module (230) increases cost, and the second inverter (300) is left out with a surplus input port to the disadvantage of efficient usage of device.

SUMMARY

The present disclosure has been made to solve the foregoing disadvantages of the prior art and therefore an object of certain embodiments of the present disclosure is to provide a method for sharing input and output ports configured to share input and output ports by connecting at least two inverters mounted on a circuit breaker via respective interface units.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

An object of the invention is to solve at least one or more of the above problems and/or disadvantages in whole or in part and to provide at least advantages described hereinafter. In order to achieve at least the above objects, in whole or in part, and in accordance with the purposes of the disclosure, as embodied and broadly described, and in one general aspect of the present invention, there is provided a method for sharing input/output ports in a system formed with a master inverter including a first interface unit and a slave inverter including a second interface unit, where the first and second interface units are connected, the method comprising: transmitting data to be outputted to an output port of the slave inverter to the slave inverter; and receiving data inputted to an input port of the slave inverter.

Preferably, but not necessarily, the method further comprises transmitting a request frame requesting use of an output port of the slave inverter to the slave inverter.

Preferably, but not necessarily, the request frame is transmitted along with the data to be outputted.

Preferably, but not necessarily, the method further comprises storing data inputted and outputted through input/output ports of the master inverter and input/output ports of the slave inverter.

Preferably, but not necessarily, the data is stored by being mapped to respective input/output ports.

Preferably, but not necessarily, the step of transmitting the data is performed through the first and second interface units.

Preferably, but not necessarily, the step of receiving data is performed through the first and second interface units.

In another general aspect of the present invention, there is provided a method for sharing input/output ports in a system formed with a master inverter including a first interface unit and a slave inverter including a second interface unit, where the first and second interface units are connected, the method comprising: outputting data transmitted along with a request frame through the output port in a case the master inverter requests the request frame requesting use of the output port; and transmitting data used by the master inverter among data received through the input port to the master inverter.

Preferably, but not necessarily, the method further comprises storing data inputted and outputted through input/output ports of the master inverter and through input/output ports of the slave inverter.

Preferably, but not necessarily, the data is mapped by each input/output port and stored.

Preferably, but not necessarily, the step of transmitting data includes transmitting through the second interface unit and the first interface unit.

The method for sharing input/output ports according to the present disclosure has an advantageous effect in that the input/output ports in a system can be maximally used, free from additional request of extension module, to enable an effective use of the system and to reduce burden of additional cost.

BRIEF DESCRIPTION OF THE DRAWINGS

The accompanying drawings, which are included to provide a further understanding of the disclosure and are incorporated in and constitute a part of this application, illustrate embodiment(s) of the disclosure, and together with the description serve to explain the principle of the disclosure. In the drawings:

FIG. 4A is a schematic view explaining data stored in storage of a master inverter according to an exemplary embodiment of the present disclosure;

FIG. 4B is a schematic view explaining data stored in storage of a slave inverter according to an exemplary embodiment of the present disclosure;

FIG. 5 is a flowchart illustrating a method for sharing input/output ports in an inverter executed by a controller of a master inverter according to an exemplary embodiment of the present disclosure.

DETAILED DESCRIPTION

Figure 1:
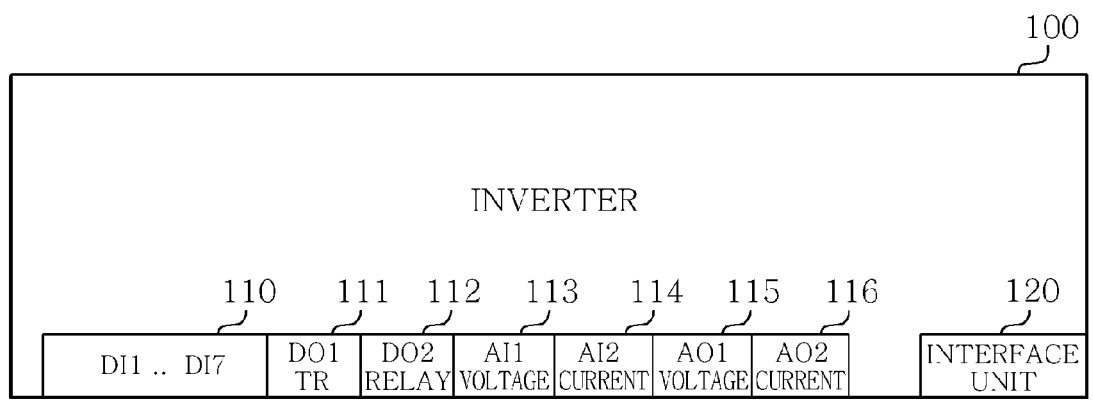
FIG. 1 is a schematic view illustrating input/output ports of an inverter according to prior art.

An exemplary embodiment will be described more fully hereinafter with reference to the accompanying drawings, in which the exemplary embodiment is shown. The present inventive concept may, however, be embodied in many different forms and should not be construed as limited to the exemplary embodiment set forth herein. Rather, this exemplary embodiment is provided so that this description will be thorough and complete, and will fully convey the scope of the present inventive concept to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. As may be used herein, the terms "substantially" and "approximately" provide an industry-accepted tolerance for its corresponding term and/or relativity between items.

Descriptions of well-known components and processing techniques are omitted so as to not unnecessarily obscure the embodiments of the disclosure. In the drawings, the size and relative sizes of components and regions may be exaggerated for clarity.

Hereinafter, a method for sharing input and output ports according to the present disclosure will be described in detail with reference to the accompanying drawing.

Figure 3:
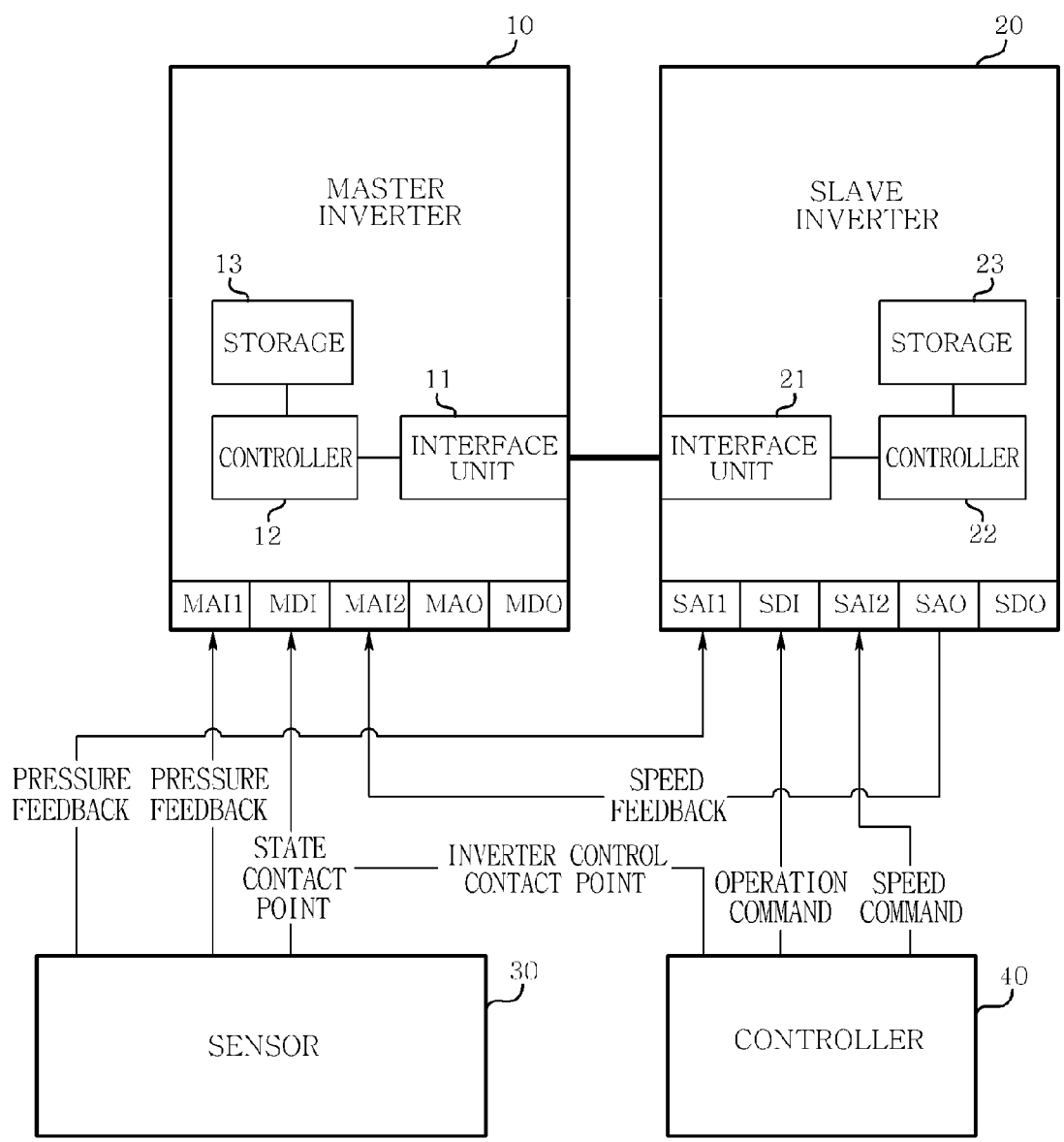
FIG. 3 is a schematic view illustrating an inverter system according to an exemplary embodiment of the present disclosure.

FIG. 3 is a schematic view illustrating an inverter system according to an exemplary embodiment of the present disclosure.

Referring to FIG. 3, the system according to the present disclosure includes a master inverter (10), a slave inverter (20), a sensor unit (30) and an upper level controller (40).

The master inverter (10) includes a master AI1 (MAI1), MAI2 and master DI (MDI) of input ports, and a master AO (MAO) and master DO (MDO) of output ports, an interface unit (11), a controller (12) and storage (13). The slave inverter (20) includes a slave AI1 (SAI1), SAI2 and slave DI (SDI) of input ports, a slave AO (SAO) and a slave DO (SDO) of output ports, an interface unit (21), a controller (22) and storage (23).

It should be apparent that the input/output ports of master inverter (10) and the slave inverter (20) are not limited thereto, and the number of ports may be determined by types of inverters. Furthermore, the number of AI, AO, DI and DO is not limited as illustrated, and it may be also assumed that several ports exist according to types thereof.

Referring to FIG. 3, the master inverter (10) is an inverter that needs additional input/output ports, and the slave inverter (20) is an inverter that has surplus input/output ports to respond to information request related to input/output of the master inverter (10). That is, selection of master inverter and slave inverter is relative, such that an operator can selectively choose the master inverter (10) and the slave inverter (20).

The master inverter (10) and the slave inverter (20) periodically exchange mutually input/output data information through respective interface units (11, 12). Although operations of the present disclosure may be performed through the upper level controller (40), the operations may be preferably performed by controllers (12, 22) of each inverter (10, 20).

Figure 2:
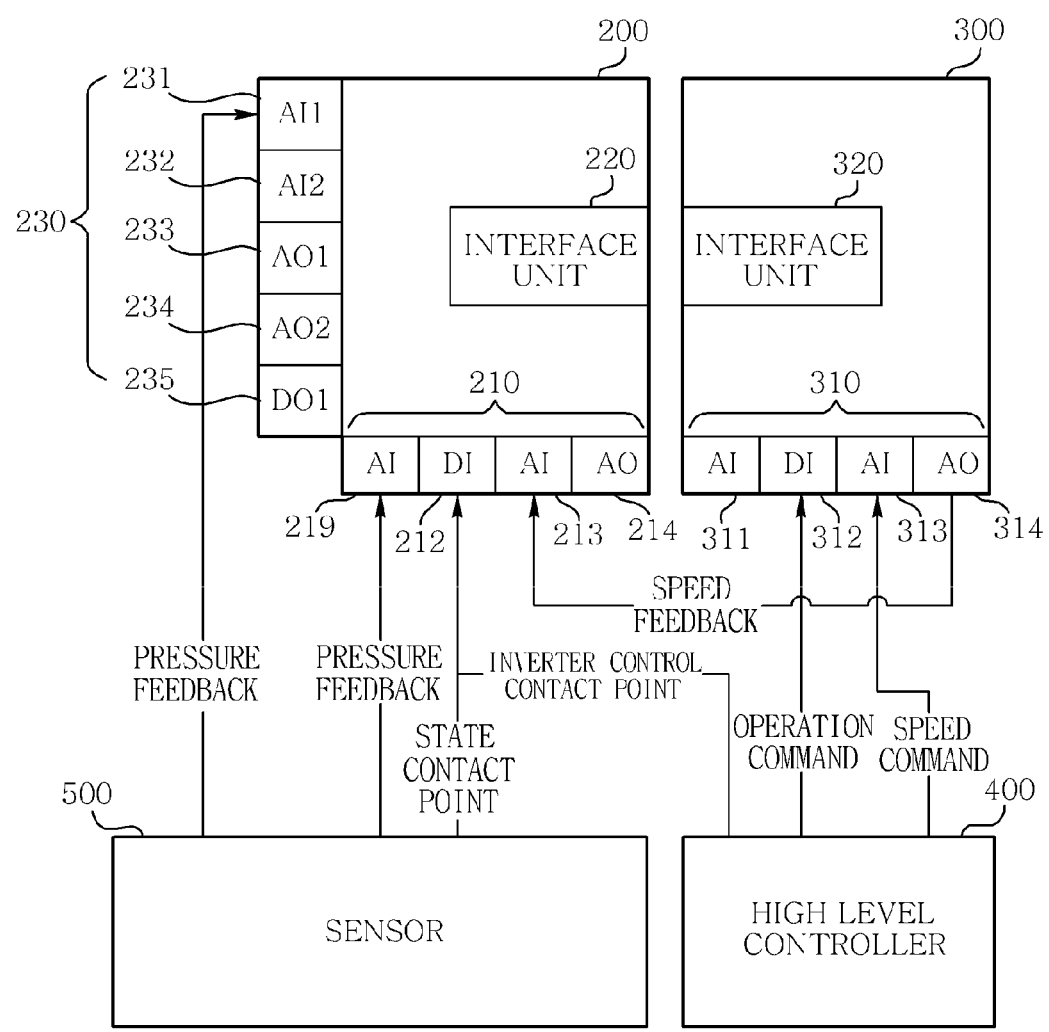
FIG. 2 is a schematic view illustrating a system using two inverters according to prior art.

In comparison with FIG. 2, instead of inputting 'pressure feedback' signal of the sensor unit (30) by mounting an extension input module (230) on the master inverter (10), the signal is inputted through SAI1 of the slave inverter (20), and the inputted signal is received by the interface units (11, 21). In the drawing, although sharing of only input port (SAI1) is exemplified, it should be obvious to the skilled in the art that both input port and output port can be used. Although two inverters are exemplified to function as a master inverter and a slave inverter in FIG. 3, it should be apparent that the number of inverters is not limited thereto, and the present disclosure may be applied to a case where input/output ports are shared by several inverters.

The respective controllers (12, 22) of the master inverter (10) and the slave inverter (20) may store data used by respective inverters in respective storages (13, 23) as formats shown in FIGS. 4A and 4B. FIG. 4A is a schematic view explaining data stored in the storage of the master inverter according to an exemplary embodiment of the present disclosure and FIG. 4B is a schematic view explaining data stored in the storage of the slave inverter according to an exemplary embodiment of the present disclosure.

Referring FIG. 4A, input/output data (master 10 data) of the master inverter (10) and input/output data (slave 10 data) of the slave inverter (20) is stored in the storage (13) of the master inverter (10). Furthermore, as shown in FIG. 4B, input/output data (slave IO data) of the slave inverter (10) and input/output data (master IO data) of the master inverter (10) is stored in the storage (23) of the slave inverter (20). As illustrated, the data is stored in a map format. That is, the input/output ports may be designated, and data communicated through relevant ports may be stored.

Hereinafter, performance of the method by the controllers (12, 22) of FIG. 3 will be illustrated with reference to the accompanying drawings.

FIG. 5 is a flowchart illustrating a method for sharing input/output ports among inverters executed by the controller (12) of the master inverter (10) according to an exemplary embodiment of the present disclosure.

Referring to FIG. 5, the controller (12) of the master inverter (10) processes input/output sequence inside the master inverter (10) (S51), and outputs data to be outputted through output ports (SAO, SDO) of the slave inverter (20), to the controller (22) of the slave inverter (20) through interface units (11, 21), in a case there is an output data to be outputted through the output ports (SAO, SDO) of the slave inverter (20) (S53), where a request frame requesting use of the output port of the slave inverter (20) is also transmitted.

Furthermore, in a case there is a response from the slave inverter (20) (S55), that is, in a case there is data to be inputted to the input ports (SAI1, SAI2, SDI) of the slave inverter (20), the input data of the input ports (SAI1, SAI2, SDI) received through the interface units (11, 21) are stored in the storage (13), which may be used for inner sequence.

Figure 6:
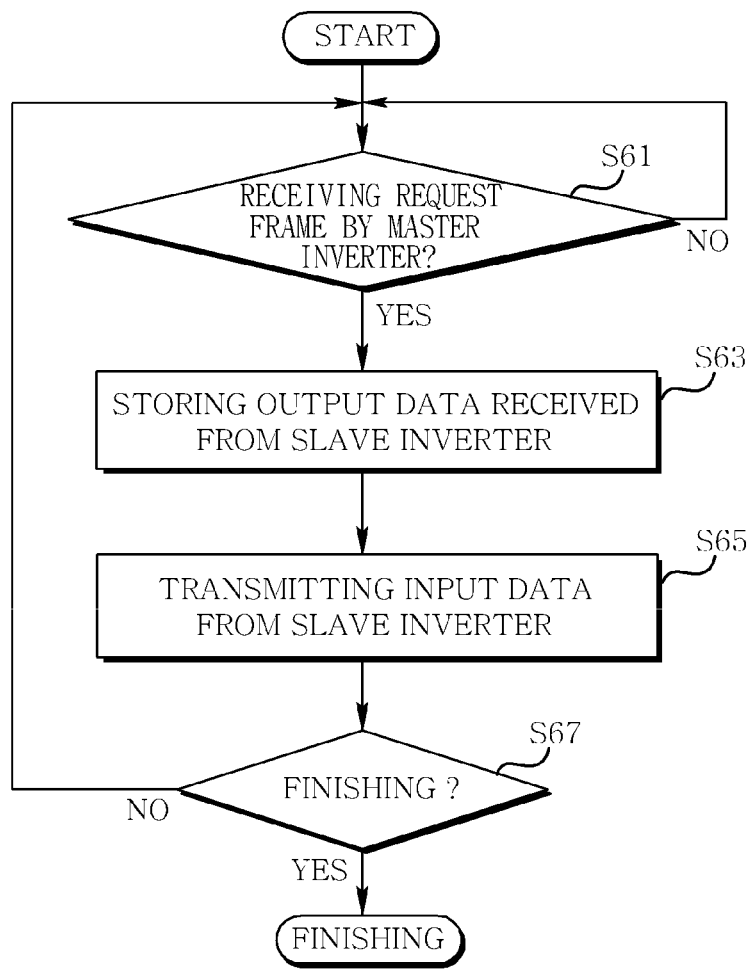
FIG. 6 is a flowchart illustrating a method for sharing input/output ports in an inverter executed by a controller of a slave inverter according to an exemplary embodiment of the present disclosure.

FIG. 6 is a flowchart illustrating a method for sharing input/output ports among inverters executed by the controller (22) of the slave inverter (20) according to an exemplary embodiment of the present disclosure.

Referring FIG. 6, in a case a request frame requesting use of output ports (SAO, SDO) of the slave inverter (20) is received from the controller (12) of the master inverter (10) (S61), the controller (22) of the slave inverter (20) stores data to be outputted through relevant output port (S63), and outputs through the output ports (SAO, SDO).

Furthermore, in a case there is data used by the master inverter (10) among data received through an input port of the slave inverter (20), which can be easily determined by the controller (22) because the data to be used is pre-stored as shown in FIG. 4B, the data may be transmitted to the controller (11) of the master inverter (10) through the interface units (21, 11). The controller (12) of the master inverter (10) may receive the data inputted through the input ports (SAI, SDI) of the slave inverter (20), through the interface units (21, 22), which may be used for inner sequence.

The previous description of the present disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

As apparent from the foregoing, the method for sharing input and output ports according to the present disclosure has an industrial applicability in that the input/output ports in a system can be maximally used, free from additional request of extension module, to enable an effective use of the system and to reduce burden of additional cost.

What is claimed is:

1. A method for sharing input and output ports in a system comprising a master inverter including a first interface unit and a slave inverter including a second interface unit, the first interface unit connected to the second interface unit, the method comprising:
    transmitting data to the slave inverter, the data to be output to an output port of to the slave inverter;
    transmitting a request frame to the slave inverter, the request frame requesting use of the output port of the slave inverter; and
    receiving data that is input to an input port of the slave inverter.

2. The method of claim 1, wherein the request frame is transmitted with the data to be output.

3. The method of claim 1, further comprising storing data that is input via input ports of the master inverter and slave inverter and data that is output via output ports of the master inverter and slave inverter.

4. The method of claim 3, further comprising mapping the stored data to corresponding input and output ports.

5. The method of claim 1, wherein transmitting the data is performed via the first and second interface units.

6. The method of claim 1, wherein receiving the data is performed via the first and second interface units.

7. A method for sharing input and output ports in a system comprising a master inverter including a first interface unit and a slave inverter including a second interface unit, the first interface unit connected to the second interface unit, the method comprising:
    outputting data transmitted with a request frame, the data output via an output port when the master inverter transmits the request frame requesting use of the output port; and
    transmitting data to the master inverter, the data to be used by the master inverter and the data among data received via an input port.

8. The method of claim 7, further comprising storing data that is input via input ports of the master inverter and the slave inverter and data that is output via output ports of the master inverter and slave inverter.

9. The method of claim 8, further comprising mapping the stored data to corresponding input and output ports.

10. The method of claim 7, wherein transmitting the data is performed via the first and second interface units.

11. The method of claim 7, wherein the data is received via the first and second interface units.

* * * * *